United States Patent [19]

Schuman

[11] Patent Number: 5,690,863
[45] Date of Patent: Nov. 25, 1997

[54] CURABLE INTER-POLYMER OPTICAL FIBER CLADDING COMPOSITIONS

[75] Inventor: Paul D. Schuman, Hawthorne, Fla.

[73] Assignee: Optical Polymer Research, Inc., Gainesville, Fla.

[21] Appl. No.: 644,352

[22] Filed: May 10, 1996

Related U.S. Application Data

[63] Continuation-in-part of Ser. No. 279,161, Jul. 22, 1994, abandoned.

[51] Int. Cl.$^6$ .............................. F21V 9/00; G02B 6/00
[52] U.S. Cl. ............................................ 252/582; 385/145
[58] Field of Search ........................... 252/582, 585; 385/145

[56] References Cited

U.S. PATENT DOCUMENTS

| | | |
|---|---|---|
| 4,469,724 | 9/1984 | Klinger . |
| 4,511,209 | 4/1985 | Skutnik . |
| 4,617,350 | 10/1986 | Maeda et al. . |
| 4,833,207 | 5/1989 | Kinaga et al. .................. 385/145 |
| 4,904,053 | 2/1990 | Kinaga et al. .................. 385/145 |
| 4,968,116 | 11/1990 | Hulme-Lowe et al. ......... 385/145 |
| 5,024,507 | 6/1991 | Minns et al. . |
| 5,148,511 | 9/1992 | Savu et al. ...................... 385/145 |
| 5,230,840 | 7/1993 | Nishiguchi et al. . |
| 5,239,026 | 8/1993 | Babirad et al. ................. 252/582 |
| 5,333,234 | 7/1994 | Hashimoto et al. ............ 385/145 |

*Primary Examiner*—Philip Tucker
*Attorney, Agent, or Firm*—Larson & Larson, P.A.; Herbert W. Larson, Esq.

[57] ABSTRACT

Curable optical fiber cladding compositions that exhibit improved optical, mechanical, adhesive and moisture barrier properties are prepared from a 100% reactive composition of monofunctional and multi-functional monomers. The preferred components of these compositions are low molecular weight polymers of fluorine-containing monofunctional acrylate or methacrylate monomer(s), such polymers being soluble and dissolved in a fluorocarbon acrylate or methacrylate monomer or monomers, but not necessarily those of the base polymer. The preferred cladding compositions may be prepared with or without a cross-linking monomer such as a di-functional or poly-functional acrylate of methacrylate. The claddings may also use a thermal or photoinitiator or other known polymerization initiating system and an adhesion promoter or promoters, such as acrylic or methacrylic acid, a silanol acrylate, methacrylate, alkoxysilane acrylate or methacrylate, or an alkoxy vinyl silane, aryl acrylate or methacrylate.

5 Claims, No Drawings

CURABLE INTER-POLYMER OPTICAL FIBER CLADDING COMPOSITIONS

PRIOR APPLICATION

This application is a continuation-in-part from application Ser. No. 08/279,161, filed Jul. 22, 1994 now abandoned.

FIELD OF THE INVENTION

The present invention relates to curable compositions for coating optical fibers and, more particularly, to curable cladding compositions that exhibit improved optical, mechanical, adhesive and moisture-barrier properties.

BACKGROUND OF THE INVENTION

Optical fibers formed from either pure silica, doped silica or plastic compositions generally consist of two materials—a light carrying core and an outer transparent cladding material, with the core having a higher refractive index than the cladding. The lower refractive index cladding material improves the light carrying ability or efficiency of the fiber by preventing the escape of light from the core. In general, the larger the difference in the refractive index between the core and the outer coating, the greater the luminous properties of the fiber.

A measure of this light trapping efficiency is called the "numerical aperture," N.A., of a cladded optical fiber. The angle at which light rays may enter a fiber core and be propagated down the fiber without penetrating the surface of the core is termed the "critical angle." This angle, and the fiber/cladding trapping efficiency, may be calculated from the respective refractive indices of the core and the cladding material as $(n_1^2-n_2^2)^{1/2}=N.A.$, where $n_1$ and $n_2$ are the refractive indices of the core and cladding, respectively, and N.A. defines a numerical aperture. The $\sin e^{-1}$ N.A. is the critical angle $A_c$, and the angle of the cone of light that may enter a fiber without penetrating the surface of the core is known as the "acceptance angle," $2A_c$. The larger the difference in the refractive index of the core as compared to the cladding material, the greater the light gathering and trapping efficiency of the optical fiber.

In selecting a suitable polymer for cladding optical fibers, polymers containing fluorine in place of hydrogen should yield the lowest attainable refractive index. This assumption is based on a summation of the atomic contribution to molar fraction of organic compounds. For example, fluorine has a molar refraction of 0.81 and hydrogen 1.028. See the "Handbook of Chemistry and Physics, Chemical Rubber Publishing Co." From this observation, one would normally assume that commercially available polyfluorovinyl polymers would be the polymers of choice for low refractive index cladding. However, it has been found that in general the commercially available fluoropolymers have high scattering loses. These losses are generally attributable to polymer crystallinity. For example, semi-crystalline fluoropolymers are typically translucent to opaque solids with scattering losses near one million dB/km. (See L. Blyer et al.; "Optical fiber Telecommunications," eds. S. Miller and A Chynoweth, Academic Press, Inc., New York, 1979, at 300–339).

Numerous fluorine-containing polymer systems have been reported and/or patented as cladding polymers. The predominant, and most useful, polymers are those incorporating the acrylate and methacrylate esters of fluorine-containing alcohols. For example, the polymers of the homologous series of 1,1-dihydroperfluoroalkylesters of methacrylic acid are rigid solids, while the acrylates are elastomers, having a Tg below room temperature.

A secondary, but very important, purpose served by a cladding composition is to act as a protective coating on the surface of the optical fiber core. This is especially true for pure silica fibers which deteriorate rapidly when exposed to atmospheric moisture after being "pulled" from molten silica. Because of inherent micro fissures on the fiber surface, the tensile strength of the optical fiber also deteriorates rapidly. Thus, it is important to provide a protective cladding for the silica core. Such protection can be most conveniently done with polymeric materials. In addition to lowering the refractive index, incorporation of fluorine into a cladding polymer structure also imparts an additional, desirable, moisture barrier property. See L. Klinger; J. Mater, Res. 2(6), (Nov./Dec. 1987).

U.S. Pat. No. 5,024,507, issued Jun. 18, 1991, describes the use of elastomeric co-polymers of commercial monomers such as vinylidene fluoride and hexafluoropropylene and of ter-polymers of vinylidene fluoride, hexafluoropropylene and tetrafluoroethylene as viscosity modifiers in UV curable cladding compositions. The cladding compositions are composed of a diacrylate, a fluoro substituted monacrylate and photoinitiator, with the viscosity being modified by the addition of the viscosity modifiers.

A UV curable composition is also described in U.S. Pat. No. 4,469,724, issued Sep. 4, 1984, as a coating for optical fibers that protect the fiber from stress corrosion. The polymers are prepared from cis and trans fluoropolyolacrylates containing aromatic and oxirane rings.

Skutnik, U.S. Pat. No. 4,511,209, issued Apr. 16, 1985, describes UV curable cladding compositions for optical fibers that contain more than 50% of a highly fluorinated monofunctional acrylate and have a refractive index below 1.38, a tri-functional or higher acrylate cross-linking agent, a synergistic mono or poly-functional thiol and a photoinitiator.

U.S. Pat. No. 4,617,350, issued Oct. 14, 1986, describes a thermoplastic cladding polymer that can be prepared by blending an acrylic ester polymer with a co-polymer of vinylidene fluoride and hexafluroacetone.

SUMMARY OF THE INVENTION

In accordance with the methods of the present invention, optically clear cladding inter-polymers are produced which are suitable for cladding both glass and plastic optical fibers. The viscosity of the curable polymer solutions used in this process may be varied over a wide range and composition. That is, they may be formulated to give either a 100% curable thermoplastic inter-polymer or inter-copolymer, or a 100% curable, cross-linked, infusible inter-polymer or inter-copolymer cladding composition. The refractive index may extend down to a value of about 1.37 and the physical properties can vary from an elastomer at room temperature, to semi-rigid, to an infusible cross-linked, rigid solid cladding.

DETAILED DESCRIPTION OF THE INVENTION AND PREFERRED EMBODIMENTS

The process according to the present invention for producing unique inter-polymer, optical fiber cladding compositions having a broad range of useful physical properties is accomplished by providing highly fluorinated monofunctional acrylate or methacrylate monomer(s) having a following general formula:

where

R is H, or methyl; X is $CF_3$ or H and Y is H, $CF_3$ providing that if X is H then Y is $(CH_2)_n(CF_2)_mZ$;

Z is F or H;
n is 0 to 4; and
m is 1 to 10.

The polymers or co-polymers employed according to the present invention are prepared as soluble polymers or co-polymers which are dissolved in a fluorocarbon acrylate or methacrylate monomer or monomers, but not necessarily those of the base polymer. When the polymer solution is polymerized, with or without a cross-linking monomer, an optically clear inter-polymer is formed, having a refractive index lower than that of the intended fiber core to be cladded. As those skilled in the art will appreciate, the preferred ratio of polymer to monomer depends on the application requirements. The ratio may be adjusted over a wide range depending on the molecular weight of the soluble pre-polymer and the desired solids content of the solution.

The preferred monomers of the present invention are:

| Monomer | | Monomer Refractive Index(n) |
|---|---|---|
| $CH_2=CHCOOCH_2CF_3$ | 1H,1H-trifluoroethyl acrylate | 1.3506 |
| $CH_2=C(CH_3)COOCH_2CF_3$ | 1H,1H-trifluoroethyl methacrylate | 1.3624 |
| $CH_2=C(H)COOCH(CF_3)_2$ | 2H-hexafluoroisopropyl acrylate | 1.3164 |
| $CH_2=C(CH_3)COOCH(CF_3)_2$ | 2-H-hexafluoroisopropyl methacrylate | 1.3295 |
| $CH_2=C(H)COOCH_2)_3(CF_2)_3F$ | 1H,1H-heptaflurobutyl acrylate | 1.3289 |
| $CH_2=C(CH_3)COOCH_2(CF_2)_3F$ | 1H,1H-heptafluorobutyl methacrylate | 1.3407 |
| $CH_2=C(CH_3)COOCH_2(CF)_nH$ | 1H,1H-wH-perfluoroalkylmethacrylate[1] | |
| $CH_2=C(H)COOCH_2(CF_3)_2$ | 2H-hexafluoropropyl acrylate | |
| $CH_2=C(CH_3)COOCH_2(CF_3)_2$ | 2H-hexafluoropropyl methacrylate. | |

The viscosity and polymer content of this monomer-polymer solution may be adjusted over a wide range from about 2 to 15,000 Cp to meet the various application requirements. However, the preferred viscosity range is from about 10 to 3,000 Cp.

It is also possible to prepare similar monomer/polymer solutions as shown in Example 12, infra, by self initiated, thermal polymerization as described in "Principles of Polymerization" by George Odian, McGraw-Hill, 1970. This is done by heating an inhibitor free fluorine-substituted monomer in accordance with this invention in an inert atmosphere to obtain polymer solutions of varying viscosities. The polymerization temperature is generally controlled to approximately that of the boiling temperature of the monomer. It may, however, be below that temperature for higher boiling, high molecular weight monomers. The viscosity of the thermally produced monomer/polymer solution is both time and temperature dependent and may range from a few Cp to a solid polymer. These monomer/polymer solutions may then be treated as described below.

The preferred method of preparing the cladding solutions of the present invention is by the dissolution of pre-polymers or pre-co-polymers, specifically prepared from monomers of the general formula, $CH_2=C(R)COOCHXY$, as further described below, which allows improved preparative control and versatility. In this process, it may at times be desirable to prepare polymer solutions containing high polymer content while maintaining viscosities in the preferred range of from 10 to 3,000 Cp. This is achieved through molecular weight control or limitation of the pre-polymer by the well known process of polymer chain termination through the use of chain transfer agents.

It is commonly recognized that polymer chain growth may terminate in a number of unintentional ways, such as polymer chain coupling or disproportionation or by transfer of a hydrogen atom or other species to the growing chain present in the system. Some of these chain transfers are minor and a recognized part of a polymer system. Of greater importance is the use of chain transfer agents to control the molecular weight of a polymer. The transfer constants of a number of chemical species have been found useful in practicing the present invention, including those shown in "Principles of Polymerization," cited above, at 213, such as n-butyl iodide, triethylamine, carbon tetrachloride, n-butyl mercaptan and dodecyl mercaptan, with n-butyl and dodecyl mercaptan being similar and shown to be extremely efficient, with chain transfer constants about 2000 times greater than carbon tetrachloride.

The preferred chain transfer agents of this invention are the alkyl mercapatans such as butyl or dodecyl mercaptan used in the range of 0.01 to 1.0% by weight. These, as well as other mercaptans, may be effectively used at less than 0.01 or greater than 1.0%, as well as other chain terminating compounds, to achieve similar molecular weight limiting results. The use of foul smelling mercapatans is not a problem, as suggested in U.S. Pat. No. 5,024,507, since they are used at low concentrations and become part of the polymer with no free mercaptan groups remaining after polymerization.

Fluorine-substituted di-or poly-functional acrylates or methacrylates such as glycerol tricrylate or methacrylate may be used as cross-linking monomers to produce insoluble, infusible cladding compositions. Low refractive index, highly fluorinated di-functional cross-linking monomers such as 2,2,3,3,4,4-hexafluoropentanediol diacrylate or methacrylate or the fluorocarbonpolyether diacrylate or methacrylates, L-12043 and L-9367, available from the 3M Corp., may be used as cross-linking monomers for these inter-polymers. However, due to the high molecular weight of these cross-linking monomers, high molar concentrations are required to obtain rigid cladding polymers. Thus, the preferred cross-linking monomers of this invention are the acrylate or methacrylate esters of ethylene glycol, propylene glycol or glycerol. A concentration range of from 0.1 to 5.0% by weight of cross-linking monomers is adequate to yield an infusible, insoluble cladding polymer with a preferred range between 0.3 to 3.0% by weight.

The slight refractive index increase of the inter-polymer when using these preferred cross-linking monomers may be compensated for by the addition of a small percentage of a lower refractive index, fluorine-substituted, acrylate monomer without materially altering the physical properties of the cladding inter-polymer. A fusible, soluble, thermoplastic cladding inter-polymer can be prepared by eliminating the cross-linking monomer.

Polymerization of these inter-polymers may be initiated by a variety of well known methods including thermal decomposition of organic peroxides such as, benzoyl peroxide, t-butylperoxide or through the thermal decomposition of a azonitrile such as 2,2'-azobis(2,4-dimethylpentane nitrile) or 2,2'-azobis(isobutyronitrile) and many other well known free radical generating compounds. The inter-polymers may all be polymerized through exposure to ionizing radiation such as particulate radiation with electrons, neutrons or alpha particles, as well as electromagnetic radiation such as gamma or x-rays. Any one of several of these polymerization systems may be used to cure the inter-polymer cladding solutions of this invention.

However, the system that is preferred and which permits very rapid cure rates is photoinitiation. Ultra violet light initiated polymerization of vinyl monomers is known to occur in the absence or in the presence of free radical initiators, mentioned above, or photosensitizers such as benzophenone, fluorescein, or the preferred benzoin or isobutyl benzoin ether ("Vicure 10").

The composition of these inter-polymers and inter-co-polymers are limited only by the pre-polymers and pre-co-polymers and multi-co-polymers derived from the highly fluorinated esters of acrylic and methacrylic acids having the general formula, $CH_2=C(R)COOCHXY$, that are optically clear. Homogeneous, optically clear inter-co-polymers and inhomogeneous, opaque inter-co-polymers are comparatively exemplified in Examples 5 and 6, infra. Further, these inter-polymers and inter-co-polymers can be formed with or without an adhesion promoter or promoters such as acrylic or methacrylic acid, silanol acrylate, methacrylate, alkoxysilane acrylate or methacrylate, or alkoxy vinyl sylane.

The addition of highly fluorinated acrylate monomers to the inter-co-polymers promotes adhesive properties to the polymer as exemplified in Examples 1 and 6 below.

EXAMPLE 1

(Pre-Polymer of Heptafluorobutyl Acrylate— (HFBA)

Methoxhydroquinone polymerization inhibitor was removed from the HFBA monomer by stirring with 1% activated carbon followed by filtration. A thermal initiator (2,2'-azobis(2,4-DIMETHYLPENTANE NITRILE, 0.1 pph, (VAZO 52), was added to the inhibitor free monomer and the mixture degassed and transferred in a nitrogen atmosphere to a poly(propylene) tube. The sealed tube was heated in a water bath at 30° C. and after 24 hours, the temperature was raised, in an air oven, to 45° C., for 48 hours, followed by two hours at 110° C.

The resulting polymer was a soft, optically clear, solid that exhibited adhesive properties toward diverse substrates, such as poly(tetrafluoroethylene) and glass.

EXAMPLE 2

(Co-polymers of Heptafluorobutyl Methacrylate (HFBM/FBA))

The polymerization inhibitor was removed from the two monomers as in EXAMPLE 1 and co-polymers containing 10, 20, 40 and 60% by weight HFBA were prepared. The polymerization were carried out in sealed tetrafluoroethylene telomere wax coated aluminum tubes under conditions similar to EXAMPLE 1. All the polymers adhered to the aluminum reaction tubes and were difficult to remove. However, the co-polymers containing 10 and 20% by weight HFB were hard, clear polymers and the co-polymers containing 40 to 60% HFBA were soft clear polymers. This copolymerization gave a range of physical properties from hard to soft polymers capable of being used as cladding materials. In this EXAMPLE, a mercaptan chain transfer agent could be used to improve solubility since most inter-polymers require the use of molecular weight controlled pre-polymers in order to increase the solubility of the polymers.

EXAMPLE 3

(Molecular Weight Controlled Pre-Polymers and Pre-Co-polymers of HxFIPA, HFBM and HFBA)

Polymers of hexafluoroisopropylacrylate, heptafluorobutylmethacrylate and heptafluorobutylacrylate were prepared as follows:

|  | Wt % a | Wt % b | Wt % c |
|---|---|---|---|
| Hexafluoroisopropylacrylate (HxIPA) | 10.43 | | |
| Heptafluorobutylmethacrylate (HFBM) | 79.79 | 11.03 | 99.75 |
| Heptafluorobutylacrylate (HFBA) | | 88.7 | |
| Dodecylmercaptan | 0.05 | 0.088 | 0.05 |
| Azo Initiator pph | 0.21 | 0.223 | 0.2 |

Each of these polymers were soluble in 2,2,2-trifluoroethyl acetate.

EXAMPLE 4

(Molecular Weight Control of Pre-Polymers of HFBM)

Polymers of HFBM were prepared by bulk polymerization as described in EXAMPLE 1, but with the addition of varying amounts of dodecyl mercaptan ($C_{12}SH$) to regulate the polymer chain growth. the viscosity of 3% solutions in trifluoroethyl acetate were determined at 30° C.

|  | SAMPLE | | | |
|---|---|---|---|---|
|  | 1 | 2 | 3 | 4 |
| HFBM MOLE % | 99.88 | 99.93 | 99.97 | 99.99 |
| $C_{12}SH$ MOLE % | 0.12 | 0.07 | 0.03 | 0.01 |
| VISCOSITY cSt @ 30° C. | 1.3 | 1.6 | 2.2 | 3. |

EXAMPLE 5

(Inhomogeneous Inter-Polymer of Poly (Trifluoroethyl Methacrylate) [-P(TFEM) \Heptafluorobutyl Methacrylate (HFBM))

A 19.4% by weight solution of poly(TFEM) was prepared by dissolving the polymer in a mixture of monomers composed of 96.29% by weight HPBM, 3.09% of ethyleneglycol dimethacrylate and 0.62% of a photo initiator (Vicure 10). The polymer/monomer mixture was enclosed in a polyethylene envelope, purged with nitrogen and irradiated with 3,480 micro watts/$cm^2$UV light for approximately 10 minutes until the polymer hardened. The resultant polymer was a hard, opaque solid. No refractive index determinations for this sample were possible because the polymer was opaque. This example shows inter-polymer incompatibility as compared to EXAMPLE 6 below which resulted in an optically clear, compatible inter-co-polymer.

EXAMPLE 6

(Homogeneous Inter-Co-Polymer of a Co-Polymer of Trifluroethyl Methacrylate (TFEM)/ Trifluoroethyl Acrylate (TFEA) With Trifluoroethyl Methacrylate)

This example represents the preferred embodiment of the invention since the resulting inter-polymer was a hard, clear, low refractive index cladding polymer that exhibited excellent adhesion to glass. An 80/20 co-polymer of TFEM/TFEA was bulk polymerized as described in EXAMPLE 1 to give a hard, optically clear polymer. This polymer had a refractive index of 1.414. A solution of the co-polymer was prepared by dissolving the co-polymer in TFEM as:

|  | SAMPLE 1 % | SAMPLE 2 % |
|---|---|---|
| 80/20 Co-Polymer TFEM/TFEA | 24.88 | 24.9 |
| TFEM | 73.60 | 73.6 |
| Vicure 10 | 0.47 | 0.4 |
| Ethylene Glycol dimethacrylate | 1.07 | 1.1 |

SAMPLE A-1. The viscous polymer solution was placed in a nitrogen purged polyethylene envelope and irradiated with UV light at 4980 micro watts/cm$^2$ for approximately 20 minutes. The resultant inter-co-polymer was hard and optically clear.

SAMPLE A-2. A similar sample, cast as A-1, gave an optically clear, hard polymer that had a refractive index of 1.4155.

SAMPLE B. A case film was prepared by irradiating the polymer solution cast on a glass plate and irradiated in a nitrogen atmosphere at 1850 micro watts/cm$^2$. The resultant inter-co-polymer was optically clear, hard and qualitatively exhibited excellent adhesion to the glass plate.

EXAMPLE 7

(Homo-Inter-Polymer of Poly(Trifluoroethyl Methacrylate))

This example is similar to EXAMPLE 6B. A homopolymer solution was prepared as follows:

| Poly (TFEM) | 29.55% BY WEIGHT |
|---|---|
| TFEM | 68.95 |
| Ethylene glycol dimethacrylate | 1.00 |
| Vicure 10 | 0.50 |

The polymer/monomer mixture was then cast on a glass plate an irradiated in a nitrogen atmosphere for four hours at 1800 micro watts/cm$^2$. The resulting homo-interpolymer was optically clear and hard. Adhesion to the glass plate appeared to be very good but somewhat less than that of the inter-co-polymer of EXAMPLE 6.

EXAMPLE 8

(A Cladding Homo-Interpolymer of Poly (Trifluoroethyl Methacrylate))

This example is similar to EXAMPLE 7. A polymer solution was prepared as follows:

| Poly (TFEM) | 25.76% by weight |
|---|---|
| TFEM | 74.24 |
| Ethyleneglycol Dimethacrylate | 5.1 |
| Vicure 10 | 0.32 |

A part of this mixture was then placed in a 4 mil polyethylene envelope, purged with nitrogen, sealed and irradiated with a low intensity, 40 w UV lamp at 3,800 micro watts/cm$^2$ for ten minutes. At the end of this time, the polymer was hard, clear and infusible.

EXAMPLE 9

(Molecular Weight Controlled Pre-Polymers of TFEM and HFBM)

Polymers of TFEM and HFBM were bulk polymerized using approximately equal molar concentrations of dodecyl mercaptan ($C_{12}$ SH) as:

| Component | 1 | 2 |
|---|---|---|
| TFEM | 99.9% | — |
| HFBM | — | 99.935% |
| $C_{12}SH$ | 0.10 | 0.065 |
| Vazo 52 | 0.2 pph | 0.2 pph |

The polymerization components were combined, mixed, degassed and transferred to nitrogen purged polypropylene tubes and polymerized initially at 45° for twenty-three hours followed by two hours at 100°. The polymers were crystal clear and hard.

| 5% Polymer solution Viscosity | | |
|---|---|---|
| Solvent | | |
| TFEM | 6.94 cSt | — |
| HFBM | — | 6.77 cSt |

EXAMPLE 10

(Homo-Inter-Polymer of TFEM)

The following polymer solution was prepared from EXAMPLE 9-1 polymer as follows:

| P (TFEM) | 35.0% by weight |
|---|---|
| TFEM | 65.025 |
| Ethyleneglycol dimethacrylate | 0.65 |
| Vicure 10 | 0.325 |

Separate cast films were prepared by irradiating the viscous polymer solution cast on a poly (methylmethacrylate) sheet, on a plate glass sheet and a casting in a nitrogen purged polyethylene envelope. The polymer solutions were irradiated at approximately 3,800 micro watts/cm$^2$. After fifteen minutes, irradiation all polymers were clear, hard and infusible.

The polymer cast on the PMMA sheet could not be removed without damaging both the P(TFEM) and the PMMA. In contrast with EXAMPLE 6, the casting on glass was easily removable. The polymer sheet cast in the polyethylene envelope could be heated with little distortion and without melting, but with some internal bubble formation.

EXAMPLE 11

(Addition of Acrylic Acid to Homo-Inter-Polymer of TFEM)

The following polymer solution was prepared from the EXAMPLE 9-1 polymer as follows:

| P (TFEM) | 29.6% by weight |
|---|---|
| TFEM | 68.4 |
| Ethyleneglycol Dimethacrylate | 0.69 |

|  |  |
|---|---|
| Vicure 10 | 0.35 |
| Acrylic acid | 0.69 |

The resulting solution was cast on a glass plate and irradiated, in a nitrogen atmosphere, at 2800 micro watts/cm. After ten minutes, the solution cured to an adherent, clear, hard polymer. Prior to the addition of the acrylic acid, the polymer solution viscosity was 1104 cSt at 30°.

EXAMPLE 12

(Preparation of a P(TFEM) Cladding Inter-Polymer The P(TFEM) Pre-Polymer)

A low molecular weight pre-polymer of TFEM was prepared from inhibitor free TFEM as described in EXAMPLE 4 but using 0.6% dodecyl mercaptan. Polymer solution viscosities were determined in TFEM as follows:

| Polymer Wt. % | 5 | 10 | 19.7 | 22.05 |
|---|---|---|---|---|
| Viscosity, cSt @ 30° C. | 1.66 | 4.01 | 18.63 | 26.22 |
| Viscosity, cPs @ 30° C. | 1.90 | 4.59 | 21.76 | 30.61 |
| Solution density g/cc | 1.143 | 1.146 | 1.168 | 1.168 |

Cladding Solution and Polymer

A cladding solution was prepared from the above 22.05% solution by the addition of 1% by wt. ethyleneglycol dimethacrylate and 1% vicure 10. A film was cast on a glass plate similar to EXAMPLE 7 and irradiated in a nitrogen atmosphere at 4200 micro watts/cm$^2$. After five minutes the casting was a 70 micron clear, hard film with an excellent bond to the glass plate. A ⅛"×6" cast PMMA rod was coated with this cladding solution and UV cured yielding a hard clear, cladding. It was found possible to heat and bend the PMMA rod without distortion or cracking the cross-linked Inter-Polymer coating.

EXAMPLE 13

(Thermal Polymerization of TFEM and GFBM)

Into a 100 ml, 3-neck flask, fitted with a reflux condenser, a nitrogen purge and an immersion thermometer was added 26 g. of inhibitor free TFEM monomer. The flask and contents were heated with a heating mantel to an internal temperature averaging 105° over a 30 hour period. At the end of this time, the polymer solution had a viscosity of 224 cSt at 30° C.

EXAMPLE 14

(Cross-linked and Uncross-linked Inter-Polymers of TFEM)

Pre-polymer solutions were prepared as follows:

|  | 1 | 2 |
|---|---|---|
| Pre-polymer from EX. 12, | 41.3% | 41.5% |
| TFEM | 57.2 | 58.0 |
| Ehtyleneglycol dimethacrylate | 0.5 | 0.0 |
| Vicure 10 | 0.5 | 0.5 |

Each of these solutions was cast on a PMMA sheet and irradiated, in a nitrogen atmosphere, at 3,800 micro watts/cm$^2$ UV light for 10 minutes. There was no detectable difference in cure time for each casting with both resulting in optically clear, strongly adherent films.

While the invention herein has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim the following:

1. A method for producing an optically clear, cladding inter polymer with a low refractive index on a silica or plastic optic fiber comprising the steps of (a) providing one or more monomers selected from monomers of the formula:

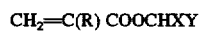

$$CH_2=C(R) \, COOCHXY$$

wherein
   R is hydrogen or methyl,
   X is hydrogen or perfluoromethyl,
   Y is hydrogen or perfluoromethyl, providing that if X is hydrogen then Y is $(CH_2)n \, (CF_2)m \, Z$ wherein
   Z is hydrogen or fluorine,
   n is 0 to 4 and
   m is 1 to 10;

(b) polymerizing the one or more monomers in the presence of a polymerization initiator and a polymer chain transfer agent to form a low molecular weight soluble pre-polymer;

(c) dissolving the pre-polymer in monomers of the same formula provided in step (a) in the presence of an ultra violet or thermal polymerization initiator to form a reactive pre-polymer solution;

(d) admixing a cross-linking di- or poly-functional acrylate or methacrylate ester with the reactive pre-polymer solution;

(e) applying the solution of (d) to an optical fiber and (f) initiating the polymerization of the solution of (d) to form a cured cladding polymer on the optical fiber.

2. The method according to claim 1 wherein the one or more monomers is selected from the group consisting of
   1H, 1H - trifluoroethyl acrylate,
   1 H, 1H - trifluorethyl methacrylate,
   2H, hexafluoroisopropyl acrylate,
   2H, hexafluoroisopropyl methacrylate,
   1H, 1H - heptafluorobutyl acrylate,
   1H, 1H - heptafluorobutyl methacrylate,
   2H - hexafluoropropyl acrylate,
   2H - hexafluoropropyl methacrylate,
   1H, 1H - wH - perfluoroalkyl methacrylate.

3. The method according to claim 1 wherein the concentration of cross-linking ester in the reactive pre-polymer solution is 0.1 to 5.0% by weight.

4. The method according to claim 1 wherein the acrylate or methacrylate ester admixed in step (d) is the acrylate or methacrylate esters of ethylene glycol, propylene glycol or glycerol.

5. The method according to claim 1 wherein the acrylate or methacrylate ester admixed in step (d) is glyceroltriacrylate or glyceroltrimethacrylate.

* * * * *